(12) United States Patent
Kahana (10) Patent No.: US 12,433,323 B2
(45) Date of Patent: *Oct. 7, 2025

(54) SYSTEM COMPRISING A MACHINE FOR PREPARING A SMOKABLE PRODUCT FROM A PORTION CAPSULE

(71) Applicant: BetaPod, Inc., Wilmington, DE (US)

(72) Inventor: Ofer Kahana, Wilmington, DE (US)

(73) Assignee: BetaPod, Inc., Wilmington, DE (US)

( * ) Notice: Subject to any disclaimer, the term of this patent is extended or adjusted under 35 U.S.C. 154(b) by 442 days.

This patent is subject to a terminal disclaimer.

(21) Appl. No.: 18/183,430

(22) Filed: Mar. 14, 2023

(65) Prior Publication Data

US 2023/0217985 A1 Jul. 13, 2023

Related U.S. Application Data

(63) Continuation of application No. 17/703,565, filed on Mar. 24, 2022, now Pat. No. 11,627,757, which is a
(Continued)

(51) Int. Cl.
*A24C 5/39* (2006.01)
*A24B 15/18* (2006.01)
(Continued)

(52) U.S. Cl.
CPC ............ *A24C 5/399* (2013.01); *A24B 15/183* (2013.01); *A24C 5/10* (2013.01); *A24D 1/18* (2013.01); *A24F 23/00* (2013.01)

(58) Field of Classification Search
None
See application file for complete search history.

(56) References Cited

U.S. PATENT DOCUMENTS

| 4,724,429 A | 2/1988 | Millen et al. |
| 9,814,259 B1 | 11/2017 | Richmond et al. |

(Continued)

FOREIGN PATENT DOCUMENTS

| CA | 240342 | 5/1924 |
| CN | 108357700 | 8/2018 |

(Continued)

OTHER PUBLICATIONS

Patent Cooperation Treaty (PCT) Notification of Transmittal of the International Search Report and the Written Opinion of the International Searching Authority, or the Declaration regarding PCT/US2019/061568 dated Jan. 14, 2020; 12 pages.

*Primary Examiner* — Dionne W. Mayes
(74) *Attorney, Agent, or Firm* — Concourse Law Group; Katherine B. Sales, Esq.

(57) ABSTRACT

A machine for preparing a smokeable product, the machine comprising a housing, a capsule receiving compartment within the housing, the capsule receiving compartment configured to receive a capsule used to prepare the smokeable product, a rolling medium holder movably coupled to the housing, the rolling medium holder configured to receive at least one rolling medium and move between an open position and a closed position, and a tamper coupled to the housing and configured to facilitate movement of smokeable material from the capsule into a rolling medium.

20 Claims, 8 Drawing Sheets

Related U.S. Application Data continuation of application No. 16/684,516, filed on Nov. 14, 2019, now Pat. No. 11,497,239.

(60) Provisional application No. 62/817,376, filed on Mar. 12, 2019, provisional application No. 62/767,545, filed on Nov. 15, 2018.

(51) Int. Cl.
*A24C 5/10* (2006.01)
*A24D 1/18* (2006.01)
*A24F 23/00* (2006.01)

(56) References Cited

U.S. PATENT DOCUMENTS

| | | | |
|---|---|---|---|
| 10,028,618 | B1 | 7/2018 | Benson |
| 10,518,965 | B2 | 12/2019 | Garcin et al. |
| 11,497,239 | B2* | 11/2022 | Kahana ................ A24B 15/183 |
| 11,627,757 | B2* | 4/2023 | Kahana ................... A24F 40/42 |
| | | | 131/27.1 |
| 2008/0060663 | A1 | 3/2008 | Hamade et al. |
| 2010/0126518 | A1 | 5/2010 | Saleh |
| 2011/0259205 | A1 | 10/2011 | Delorme |
| 2011/0265805 | A1 | 11/2011 | Laplante |
| 2013/0236609 | A1 | 9/2013 | Magniet et al. |
| 2015/0075544 | A1 | 3/2015 | Portz et al. |
| 2016/0331913 | A1 | 11/2016 | Bourque |
| 2018/0035711 | A1 | 2/2018 | Rayson |
| 2018/0105355 | A1 | 4/2018 | Harif |
| 2018/0213838 | A1 | 8/2018 | Richmond et al. |
| 2018/0303152 | A1 | 10/2018 | Douglas |
| 2018/0317544 | A1 | 11/2018 | Hagen |
| 2019/0053535 | A1 | 2/2019 | Birza |
| 2019/0300275 | A1 | 10/2019 | Faravelli |
| 2019/0367260 | A1 | 12/2019 | Robotti |
| 2019/0375574 | A1 | 12/2019 | Anderson et al. |
| 2020/0087011 | A1 | 3/2020 | Lui |
| 2020/0377292 | A1 | 12/2020 | Glaesser et al. |

FOREIGN PATENT DOCUMENTS

| | | |
|---|---|---|
| EP | 2179667 | 4/2010 |
| ES | 2480492 | 7/2014 |
| WO | 2018/121813 | 7/2018 |

* cited by examiner

SYSTEM COMPRISING A MACHINE FOR PREPARING A SMOKABLE PRODUCT FROM A PORTION CAPSULE

CROSS-REFERENCE TO RELATED APPLICATIONS

This application is a continuation application of U.S. Non-Provisional patent application Ser. No. 17/703,565, titled "System Comprising a Machine for Preparing a Smokeable Product from a Portion Capsule," filed Mar. 24, 2022, which is a continuation application of U.S. Non-Provisional patent application Ser. No. 16/684,516, titled "System Comprising a Machine for Preparing a Smokeable Product from a Portion Capsule," filed Nov. 14, 2019, which claims priority to U.S. Provisional Application No. 62/767,545, titled "System for Comprising a Machine for Preparing a Smokeable Product from a Portion Capsule," filed Nov. 15, 2018, and U.S. Provisional Application No. 62/817,376, titled "System for Comprising a Machine for Preparing a Smokeable Product from a Portion Capsule," filed Mar. 12, 2019, the contents which are incorporated by reference herein in their entirety.

FIELD OF THE INVENTION

The present invention relates to accessories for smokeable products and, more particularly, to a machine for preparing a smokeable product using a pre-packaged portion capsule.

BACKGROUND OF THE INVENTION

Many people have the desire to smoke various smokeable materials, including cannabis. Cannabis is typically sold in the form of a flower, and must be converted to a loose material that is then placed into rolling paper before it can be smoked. The process of converting the flower into the loose material is performed manually, which can be messy and is not always convenient to do in every location or circumstance. One way that users circumvent this problem is to break up or grind up the flowers in advance, but then the freshness and quality of the smokable material may be reduced.

For the foregoing reasons there is a need for a pre-packaged capsule configured to contain a smokeable material, and a machine for transferring the smokeable material from the capsule, into a rolling medium, and preparing a smokeable product.

SUMMARY OF THE INVENTION

The present invention is directed to a machine that uses capsules to create a smokeable product that is rolled in a rolling medium. The machine comprises a housing, a capsule receiving compartment, a rolling medium holder, and a tamper.

The capsule receiving compartment is within the housing and is configured to receive a capsule used to prepare the smokeable product.

The rolling medium holder is movably coupled to the housing and is configured to receive at least one rolling medium and move between an open position for receiving the rolling medium, and a closed position for forming the smokeable product.

The tamper is coupled to the housing and is configured to puncture the capsule to permit and facilitate movement of smokeable material from the capsule into a rolling medium.

Optionally, the tamper is supported by a support structure that is slidably coupled to a top surface of the housing, and the support structure can slide between a forward position and a recessed position, and when in the forward position the tamper is positioned directly above the capsule located in the capsule receiving compartment, and when in the recessed position, the tamper is positioned distal the capsule receiving compartment so that the capsule receiving compartment may be accessed by a user.

The tamper can be electrically coupled to a tamper motor that is configured to move the tamper up and down. Optionally, the tamper motor is also configured to turn the tamper.

The machine can have a capsule sensor located within the capsule receiving compartment and a rolling medium sensor located within the rolling medium holder.

The machine can have a vibration plate mounted to the housing and at least one vibration motor coupled to the vibration plate, wherein the capsule receiving compartment is disposed within the vibration plate. Optionally, there are two vibration motors coupled to the vibration plate.

The machine can comprise a waste chamber coupled to the housing and located below the rolling medium holder and configured to receive any waste that passes through the rolling medium holder as well as used capsules.

A controller can be electrically coupled to the rolling medium holder, the tamper, and the vibration plate, wherein the controller is configured to control movement of the rolling medium holder, the tamper and the vibration plate.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

It will be understood that, although the terms first, second, etc. may be used herein to describe various elements, these elements should not be limited by these terms. These terms are only used to distinguish one element from another. For example, a first vibration motor could be termed a second vibration motor, and, similarly, a second vibration motor could be termed a first vibration motor, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The Capsule

Figure 1:
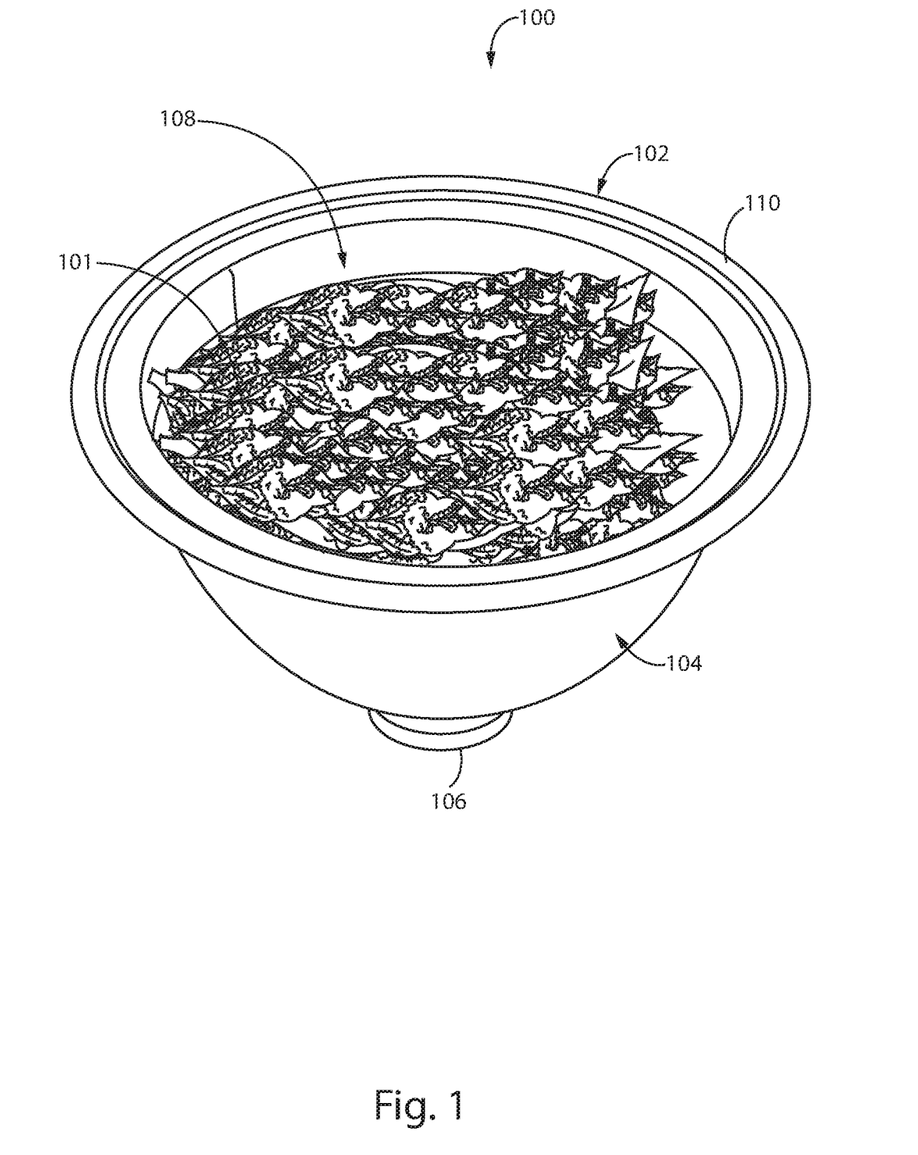
FIG. 1 is a top perspective view of a capsule configured to contain smokeable material, having features of the present invention.
Figure 2:
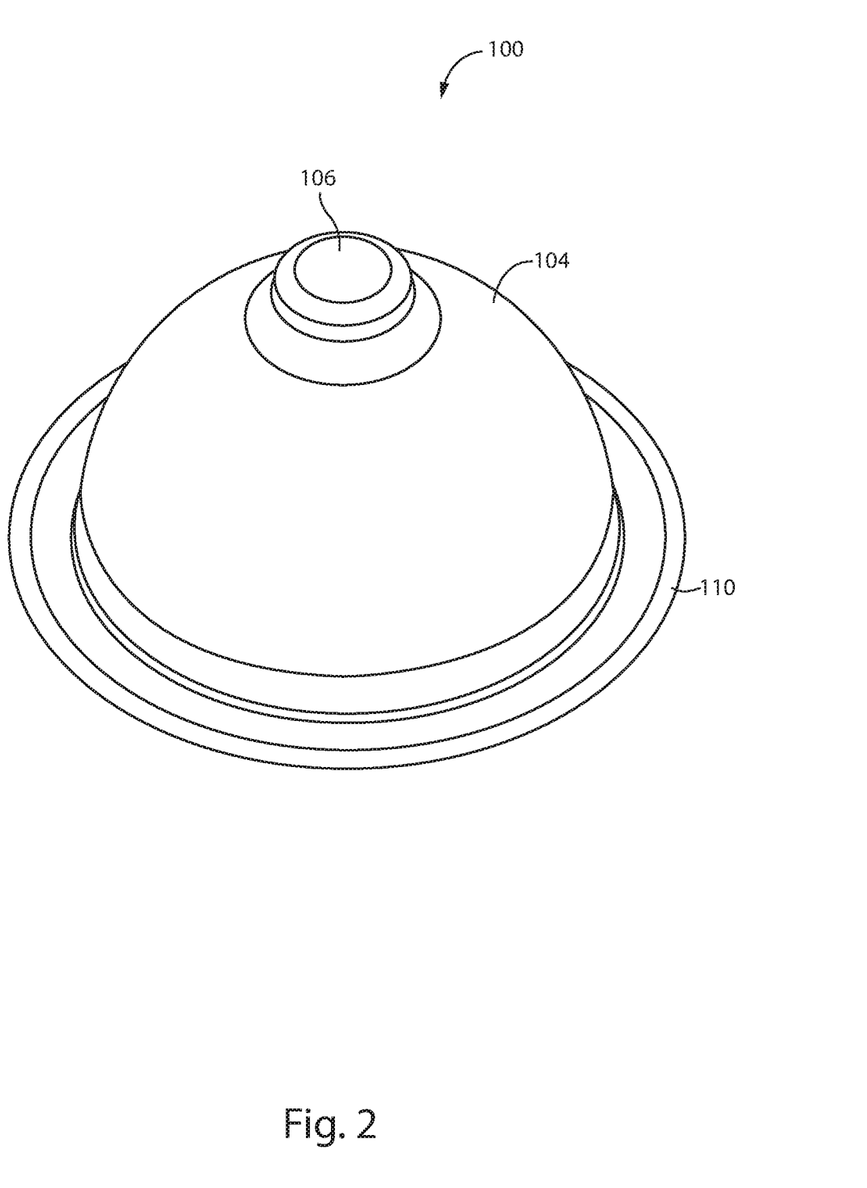
FIG. 2 is a top perspective view of the capsule of FIG. 1, wherein the capsule is upside down.
Figure 3:
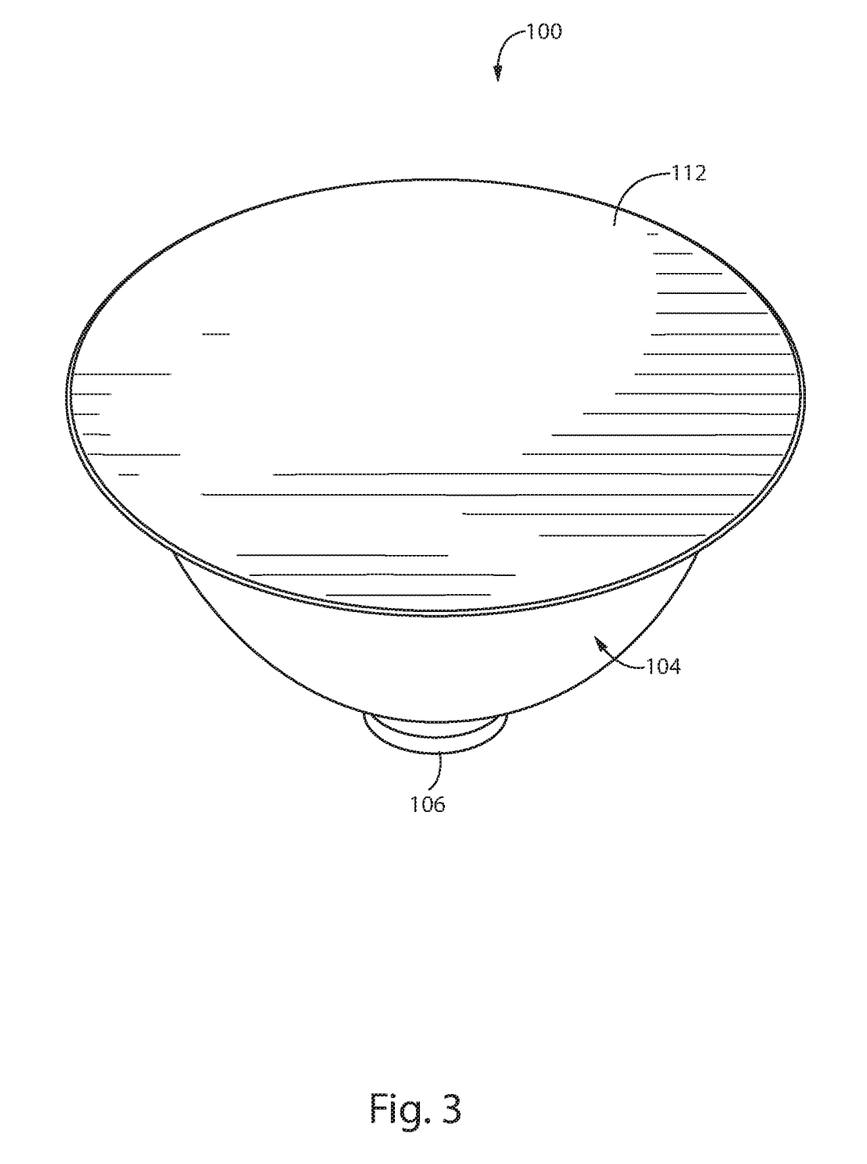
FIG. 3 is another top perspective view of the capsule of FIG. 1, wherein an aluminum foil disc is shown sealing an open top of the capsule.

Referring now to FIGS. 1 through 3, there is shown a capsule 100 that is configured to contain a smokeable material/substance 101. The capsule 100 is shaped like a bowl, having an open, top 102 and a rounded bottom 104, with a neck 106 extending from a center of the rounded bottom 104. This creates a cavity 108 within the capsule 100 for retaining smokeable material 101 therein. Preferably, top 102 is circular, and optionally, the top 102 has a lip 110 that extends around a perimeter of the top 102. The neck 106 is an extension from the bottom of the capsule 100 and can be any shape. Preferably, the neck 106 is roughly cylindrical. The neck 106 closes the rounded bottom 104 to keep the smokeable material inside the capsule until the neck is opened. For example, the neck 106 may be sealed where the neck 106 connects to the bottom 104 of the capsule 100, or the neck 106 may be sealed anywhere along the length of the neck 106, including at its free end. The circular top 102 has a diameter that is greater than a diameter of the neck 106. Typically, the capsule 100 has an internal volume of from about 1 ml to about 10 ml, and preferably, the internal volume of the capsule 100 is approximately 8 ml.

The general shape of the capsule 100 is not limited to the bowl-shaped structure shown. The shape of the capsule 100 can be any funnel-shaped configuration, such an upside down cone, or an upside down pyramid.

The capsule 100 can be made from aluminum, or a biodegradable material such as biodegradable plastic or a plant material such as a bioplastic or bioplastic resin.

As noted above, the bottom 104 of the capsule 100 is closed and the top of the capsule 100 is open. As best seen in FIG. 3, to secure/seal the smokeable material 101 within the capsule 100, a circular disc of aluminum foil 112 is coupled to the open circular top 102 of the capsule 100. Most preferably, the aluminum foil 112 is hermetically sealed to the capsule 100 to maintain the freshness and extend the life span of the material 101 contained therein by protecting it from light, humidity, and oxygen. Optionally, fabric or mesh can be used instead of aluminum foil.

The capsule 100 can be filled with any smokeable material 101, such as cannabis, hemp, and tobacco, or any combination or blends thereof, including flavoring additives, aromatics, and the like. A range of mixes/blends are offered, and the user selects according to preference or desired result.

Regarding the aromatics and/or flavorings, these components can be added to the capsule 100 in a variety of ways. First, the aromatic/flavoring can be added via one or more drops of liquid into an empty capsule 100, where the smokeable material 101 is then added, and then the capsule 100 is sealed. Second, the smokeable material 101 can be added to the capsule 100 first, then the aromatics/flavoring can be added in liquid drop form into the capsule 100, and then the capsule 100 is sealed. Third, the aromatics/flavoring can be added as a spray that is sprayed into an empty capsule 100, and then the smokeable material 101 is added to the capsule 100, and then the capsule 100 is sealed. And fourth, the smokeable material 101 can be placed in the capsule 100 first, then the aromatics/flavoring can be sprayed into the capsule 100, and then the capsule 100 is sealed.

Optionally, the capsule 100 can be infused with nitrogen such that all oxygen is removed from the interior of the capsule 100. Exposure to oxygen induces breakdown of the smokeable material 101. Thus, replacement of the oxygen with nitrogen ensures freshness of the smokeable material 101 contained therein, and lends itself to a longer shelf-life. The nitrogen can be used with or without a capsule 100 having aromatics and/or flavorings added therein.

As noted above, the capsule's 100 shape and internal structure are suited to the delivery method of the machine 400. The capsule 100 is packaged according to weight. Various weight options are offered for different sizes of joints, cigarettes, etc. Exemplary weights/dosages of material 101 contained within a capsule 100 can be from about 0.1 grams to about 2 grams, more preferably from about 0.5 grams to about 1 gram, and most preferably, 0.3 grams, 0.5 grams, 0.7 grams or 1 gram.

Optionally, the capsule 100 comprises a built-in grinder. In this embodiment, the capsule 100 includes a pre-weighed, pre-packaged amount of un-ground smokeable material 101 that is then ground within the capsule 100.

The Machine

Figure 4:
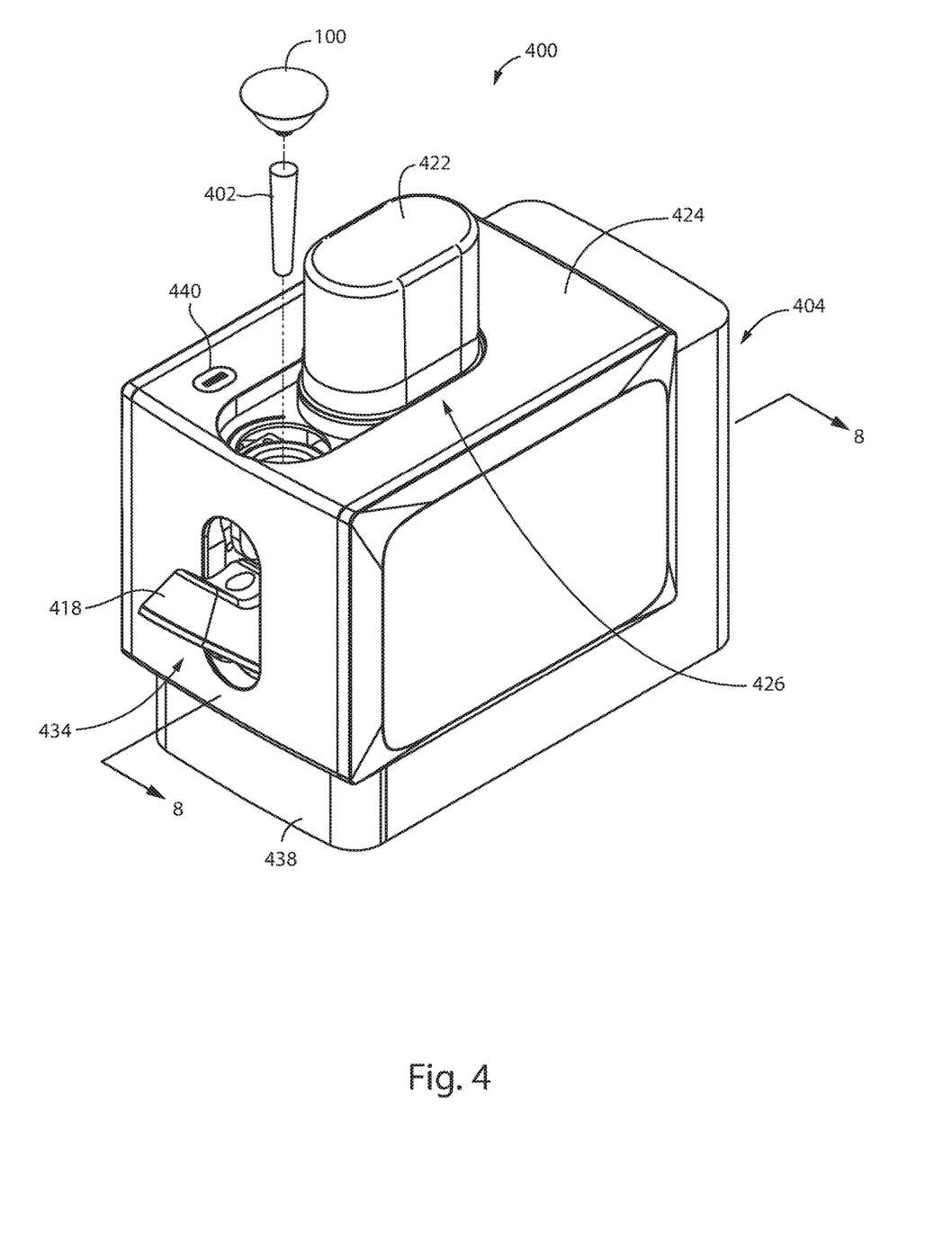
FIG. 4 is a perspective view of a machine that uses the capsule of FIG. 1 to create a smokeable product, having features of the present invention, wherein the capsule and rolling medium are positioned to be inserted into the machine and a rolling medium holder is in an open position and a support structure is in a recessed position.

Referring now to FIGS. 4 through 8, there is shown a machine 400 for preparing smokeable product according to the present invention. The machine 400 is configured to receive the capsule 100 described above, as well as a rolling medium 402 (e.g. paper or tobacco paper, etc.) or a cartridge of multiple rolling mediums 402. This is best seen in FIG. 4, where a capsule 100 and a rolling medium 402 are positioned to be inserted into the machine 400. Optionally, the machine 400 is also configured to receive a cartridge of filters and/or crutches for use with the rolling medium 402.

Figure 6:
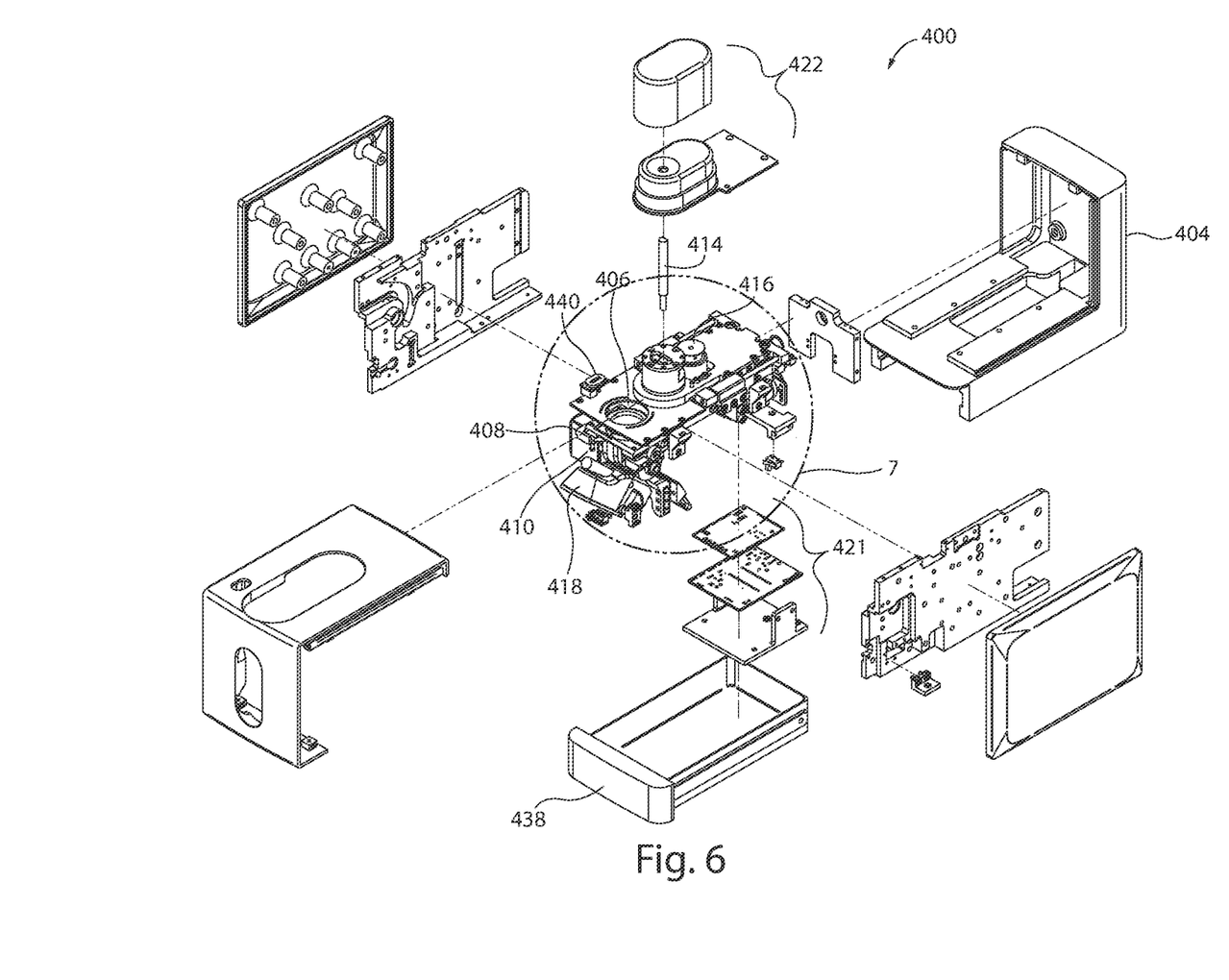
FIG. 6 is an exploded perspective view of the machine of FIG. 4.
Figure 7:
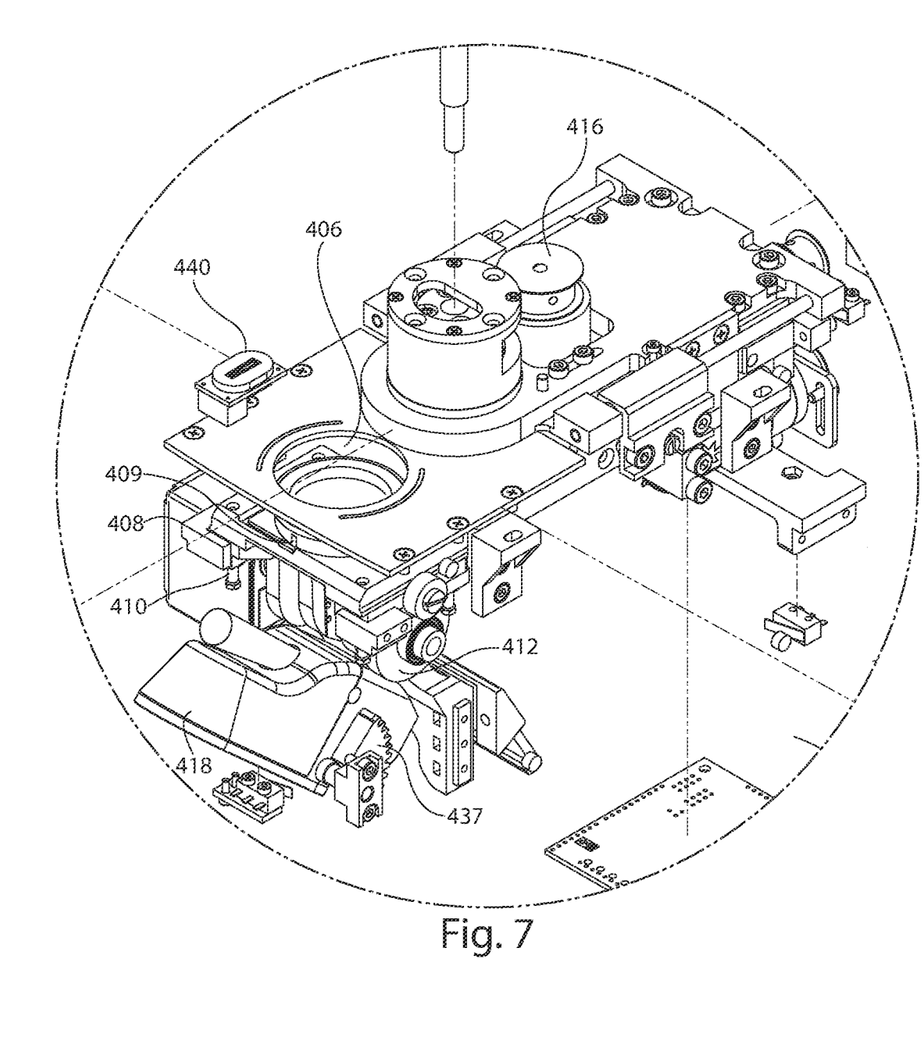
FIG. 7 an enlarged view of a section of the machine of FIG. 6.
Figure 8:
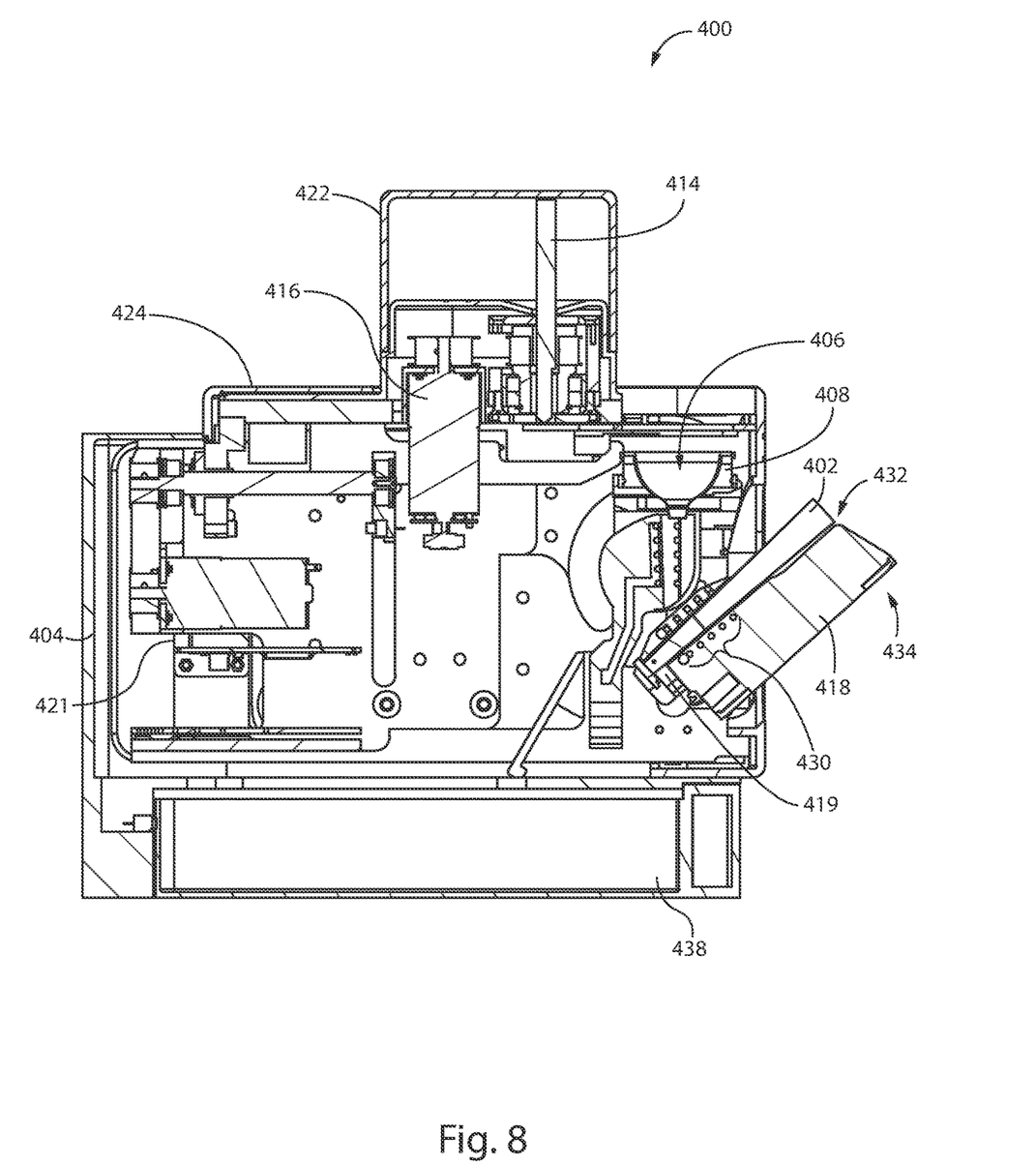
FIG. 8 is a sectional view of the machine of FIG. 4, taken along line 8-8.

As best seen in FIGS. 6-8, the machine 400 comprises a housing 404 having a capsule receiving compartment 406 disposed within a vibration plate 408 that is supported by at least one spring 410 (preferably two springs 410), at least one vibration motor 412 coupled to the vibration plate 408, a capsule sensor 409, a tamper 414, a tamper motor 416 coupled to the tamper 414, a rolling medium holder 418 for holding the rolling medium 402, and a rolling medium sensor 419. A controller 421 controls all the functions/movements of the various components of the machine 400. The housing 404 can be made from plastic or metal.

The tamper 414 and tamper motor 416 are mounted on a support structure 422 that is slidably coupled to a top surface 424 of the housing 404. The structure 422 can move between a recessed position 426, shown in FIG. 4, and a forward position 428, shown in FIG. 5. When in the forward position 428, the tamper 414 is positioned directly above the capsule receiving compartment 406 in the vibration plate 408. When in the recessed position 428, the tamper 414 is positioned out of the way, permitting a user to access the capsule receiving compartment 406. The tamper 414 can be made from plastic or metal. Preferably the tamper 414 is made from metal. The tamper 414 can be a compressing screw, an elongated member with a sharp point for puncturing the capsule 100, a plunger or a gravity propelled arrangement. Preferably the tamper 414 is a compressing screw with a threaded exterior surface. The compressing screw 414 is configured to move up and down.

When the support structure 422 is in the forward position, the compressing screw 414 moves into and out of the capsule receiving compartment 406. With the capsule 100 placed inside the capsule receiving compartment 406, the compressing screw 414 punctures the top foil disc 112 and the closed bottom/neck 106 of the capsule 100 to permit the material 101 to leave the capsule 100 and enter the rolling medium 402. When the compressing screw 414 punctures the closed bottom/neck 106 of the capsule 100, it can cause the bottom/neck 106 material to flare out slightly, which helps to facilitate transfer of the material 101 from the capsule 100 into the rolling medium 402. The screw 414 also facilitates movement of the material 101 out of the capsule 100 via its exterior surface having a threaded configuration (like a screw).

The capsule receiving compartment 406 receives and holds a capsule 100. The compartment 406 is typically an opening or a recess, with an open bottom, disposed within the vibration plate 408, such that vibration of the vibration plate 408 via the at least one vibration motor 412, after the capsule 100 has been punctured, facilitates transfer of the material 101 out of the capsule 100 and into the rolling medium 402. Optionally there can be two or more vibration motors 412, one coupled to either side of the vibration plate 408. The vibration plate 408 only vibrates the capsule 100, and the smokeable material contained therein. The vibration is useful because it helps to gently facilitate transfer of the smokeable material from the capsule 100 into the rolling medium 402 disposed below.

The rolling medium holder 418 has an open end 432 for dispensing receiving the rolling medium 402 and for dispensing the finished smokeable product after the preparation process is complete. The rolling medium holder 418 (and therefore the rolling medium 402 disposed therein) is movably mounted within the housing so that it can move between an open position 434, as shown in FIGS. 4 and 6-8, and a closed position 436, a shown in FIG. 5. Preferably, the rolling medium holder 418 is pivotally mounted within the housing, but the rolling medium holder 418 can also be slidably mounted; or otherwise, removable from the housing. It the rolling medium holder 418 is removable, the rolling medium holder 418 can come in a variety of different diameters and lengths to accommodate rolling mediums 402 of different sizes. The user simply inserts the desired sized rolling medium holder 418 in the machine 400.

As shown in FIG. 7, there is a gear mechanism 437 located within the housing 404 that pivots the rolling medium holder 418 between the open position 434 and the closed position 436.

As shown in FIGS. 4 and 6-8, when the rolling medium holder 418 is in the open position 434, the open end 432 is pivoted away from the housing 404. In the open position 434 the rolling medium holder 418 is configured to remove a finished smokeable product therefrom. Optionally, the open position 434 also permits the rolling medium holder 418 to receive and/or remove a rolling medium 402 therefrom.

Figure 5:
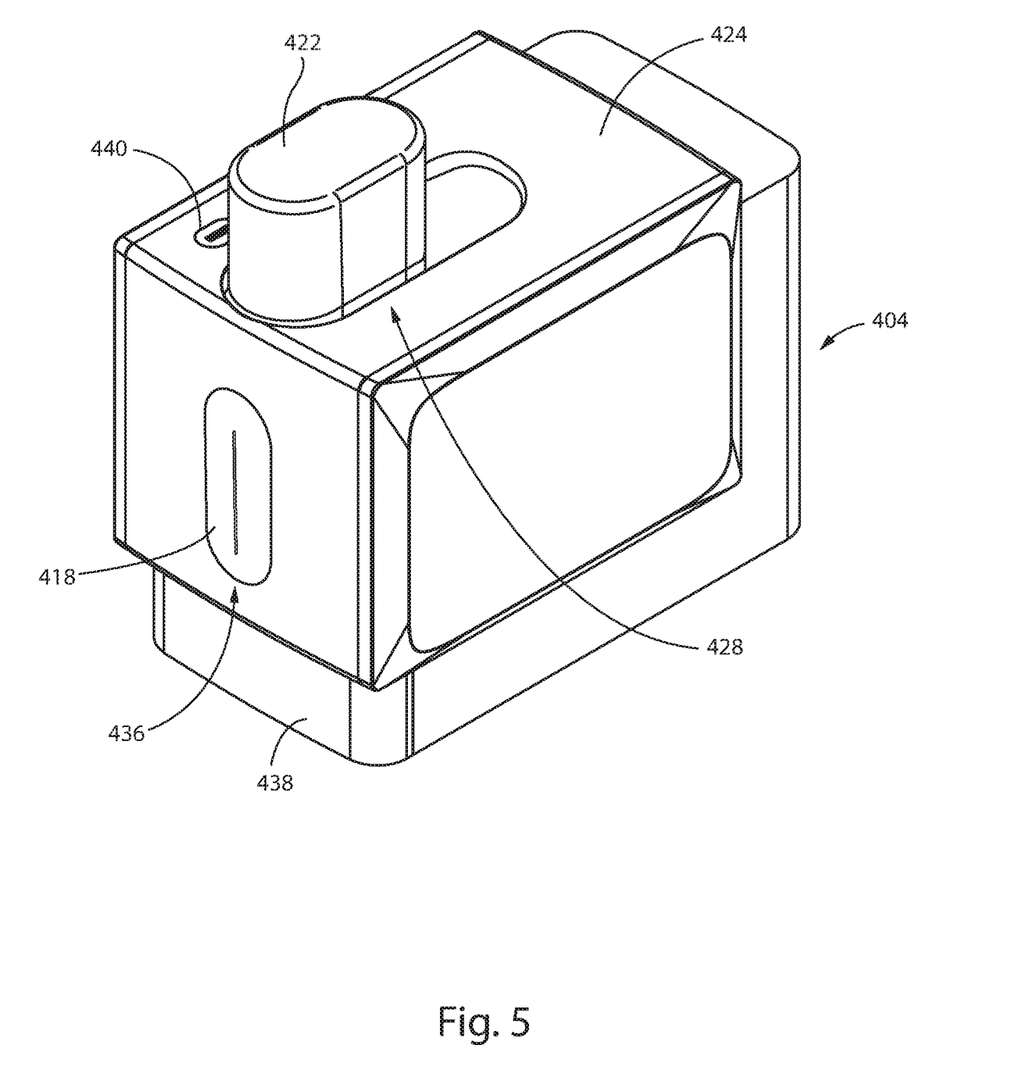
FIG. 5 is a perspective view of the machine of FIG. 4, wherein the rolling medium holder is in a closed position and the support structure is in a forward position.

As shown in FIG. 5, when the rolling medium holder 418 is in the closed position 436, the rolling medium holder 418 is vertically oriented. This vertical orientation allows a user to insert a rolling medium 402 directly into the rolling medium holder 418 through the capsule receiving compartment 406 positioned directly above. Additionally, once the rolling medium 402 is positioned within the rolling medium holder 418, the rolling medium 402 is now vertically oriented so that the rolling medium 402 is positioned directly below the capsule receiving compartment 406. When smokeable material 101 leaves the capsule 100 it falls directly into the rolling medium 402 below.

Optionally, the rolling medium holder 418 can comprise a vacuum chamber that uses vacuum pressure, via a plurality of vacuum holes, to keep the rolling medium 402 properly positioned within the machine 400 to receive the material 101 from the capsule 100. These optional vacuum holes 430 can be seen in FIG. 8. A vacuum outlet lets the vacuum chamber maintain the proper vacuum pressure throughout use.

Directly below the rolling medium holder 418 is a capsule waste box 438 for receiving and collecting used capsules 100 as well as any waste that may fall through the rolling medium holder 418. Preferably, the waste box 438 is a slidable drawer that slides out of the bottom of the machine 400 so that its contents can be thrown away. The waste box 438 can also comprise a sliding, swinging, or otherwise removable door. Typically, the waste box 438 extends almost the full length and width of the bottom of the machine 400.

As noted above, the machine 400 is configured to receive either a single rolling medium 402 or a cartridge of multiple rolling mediums 402. FIG. 4 shows a single rolling medium 402 positioned to be inserted into the machine 400, and FIGS. 6-8 show the single rolling medium 402 positioned within the machine 400. The rolling medium 402 is what holds the smokeable material 101 and allows the user to smoke the smokeable material 101.

In an exemplary embodiment, the rolling medium 402 is an elongated container to receive the smokeable material 101. Preferably, the rolling medium 402 is a pre-rolled container. More preferably, the rolling medium 402 is cone-shaped. Most preferably, the rolling medium 402 is a pre-rolled paper cone. The paper cone 402 can be rolled with or without a filter or a crutch, which is discussed in greater detail below. When loaded within the machine 400, the paper cone 402 is disposed in a vertical orientation. The smokeable material 101 is transferred from the capsule 100 into the paper cone 402 via the compressing screw 414, which punctures the capsule 100 and pours, pushes or otherwise transfers the smokeable material 101 from the capsule 100 into the mouth or open end of the paper cone 402. Optionally, the cone 402 is vibrated by the machine 400 for a predefined amount of time at a predefined amplitude. Vibrating the cone 402 settles the smokeable material 101 therein and removes air pockets. Once the cone 402 is filled, the compressing screw 414 performs a tamping function and gently tamps down the smokeable material 101 within the cone 402 to make sure that the smokeable material 101 is not too tightly or loosely packed, which could result in the smokeable material 101 burning poorly. Optionally, a separate plunger member can gently tamp down the smokeable material 101 inside the rolling medium 402.

The tamper (compressing screw 414) described above is suited for a vertically oriented rolling medium holder 418/rolling medium 402. If the rolling medium holder 418 (and therefore the rolling medium 402 disposed therein) is horizontally oriented, an Archimedes screw or plunger can be used to fill the horizontally oriented rolling medium 402 by penetrating the capsule 100 and propelling the smokeable material 101 from the capsule 100 into the rolling medium 402. Once the rolling medium 402 is filled, it can then be rotated into a vertical orientation and vibrated by the machine 400 for a predefined amount of time at a predefined amplitude.

Typically, the rolling medium 402 is made from paper that is plant-based and can include but is not limited to hemp, bamboo, and rice. Commercial cigarette paper can also be used, as well as cigar paper which is made from the tobacco plant and contains nicotine. Cannabis rolled in cigar paper is known as a "Blunt" as opposed to a "Joint" which is cannabis rolled in the paper described above. The rolling medium 402 can vary in size depending on the smokeable product the user wishes to make.

As noted above, the machine 400 can also be configured to receive a filter or "crutch" as it is known when used in a joint. Joints often include a paper filter known as a crutch, which adds stability to the roll and allows the user to enjoy the joint without burning their fingertips. Filters are also used in hand-rolled cigarettes. Some additional advantages of using a filter include:

Improves the durability of the joint;
A solid filter can create good airflow throughout the joint.
Prevents the joint/cigarette from crumbling or dissolving too quickly. As a result, it will also help conserve precious cannabis.

The filter can either be preloaded into the machine 400, or the user can attach a filter to the rolling medium 402 before the rolling medium 402 is placed into the machine 400.

In another embodiment, the paper (rolling medium 402) is not pre-rolled in a cone shape, but rather the unrolled paper is set up horizontally to receive the smokeable material 101. The smokeable material 101 is removed from the capsule 100 and uniformly deposited on the open, unrolled paper. The machine 400 then rolls the paper—with or without a filter/crutch—enclosing the smokeable material 101 inside. One end of the roll is closed, either by a filter/crutch or by the machine 400 twisting one end. A plunger (or similar member) enters the open end (e.g. the end without the filter) and tamps down the smokeable material 101 inside the now-rolled paper roll.

If cartridges of rolling medium 402 are being used, the machine 400 can comprise a notification system to alert the user when the cartridge of rolling medium 402 disposed therein is empty or nearly empty.

The controller 421 is located inside the housing 404 and is electrically coupled to the rolling medium holder 418, the support structure 422, the vibration plate 408 and the vibration motor 412. The controller 421 controls the movement and function of the rolling medium holder 418, the support structure 422, all the components housed within the support structure 422, and the vibration plate 408. With respect to the tamper 414, the controller 421 can also comprise a stepper controller that controls how the tamper 414 moves up and down at different speeds, and optionally, how the tamper 414 rotates at different speeds. This variation in up and down speed and rotation speed is dependent on the smokeable material 101 within the selected capsule 100. Different material 101 has different densities and consistencies, creating the need for a variation in both up and down movement and optionally rotational movement of the tamper 41.

A control button 440 is located on the top surface of the housing 404 and permits the user to start and stop the machine. The control button 440 is electrically coupled to the controller 421. Optionally, the control button 440 can be located on any surface of the machine 400. One press of the control button 440 turns the machine 400 and moves the support structure 422 to the recessed position 426 and optionally, pivots the rolling medium holder 418 to the open position 434. After the user loads a capsule 100 and a rolling medium 402 into the machine, a second press of the control button 440 causes the machine 400 to move the support structure 422 to the forward position 428 and optionally, pivot the rolling medium holder 418 to the closed position 436, and the machine 400 begins the process of preparing the smokeable product.

Optionally, the machine 400 can connect to a mobile app installed on a mobile device for controlling the machine 400 and receiving notifications from the machine 400. This connection can be via Bluetooth, Wi-Fi, or a wireless cellular network.

Optionally, the machine 400 can comprise a control panel that allows a user to select additional functions. An additional function can comprise having the machine 400 perform a tip twist feature, where the machine 400 twists the tip of the smokeable product before ejecting the fully prepared smokeable product. If the rolling medium holder 418 is oriented horizontally, the tip twist feature may not be optional, as this final step is needed to prevent the content of the smokeable material 101 from spilling out of the rolled rolling medium 402. The tip is also used to light the joint, so it may be defined as a non-optional feature. The twist tip feature is discussed in greater detail below.

The capsule 100 and machine 400 of the present invention address the problems of messy rolling and making in advance which reduce the freshness and quality of the smokeable material 101.

In use, the user selects a capsule 100 pre-filled with his or her blend of choice of smokeable material 101 and/or a blend of smokeable material 101 that reflects their current mood or state of mind. The user presses the control button 440, which activates the machine 400 and moves the support structure 422 to the recessed position 426, and optionally moves the rolling medium holder 418 to the open position 434.

Due to the alignment of the capsule receiving compartment 406 and the rolling medium holder 418 when in the closed position 436, if pressing the control button 440 only moves the support structure 422 to the recessed positon 426 (and the rolling medium holder 418 remains in the closed position 436), a user can insert a rolling medium 402 into the machine 400 via the capsule receiving compartment 406 (which permits the rolling medium 402 to fall into the rolling medium holder 418 directly below), and then the user inserts the selected capsule 100 into the machine 400 just as a coffee capsule or pod is inserted into an espresso machine.

If pressing the control button 440 also moves the rolling medium holder 418 to the open position 434, the user inserts the rolling medium 402 into the rolling medium holder 418 via the open end 432 of the rolling medium holder 418, and then inserts the selected capsule 100 into the capsule receiving compartment 406. Optionally, the rolling medium 402 can be inserted into the machine 400 before the capsule 100 is inserted into the machine 400.

Optionally, if an unrolled rolling medium 402 is used, the machine 400 rolls the rolling medium 402 into a cylinder or a cone shape, optionally with a filter or crutch coupled to one end of the rolled rolling medium 402.

Once both the rolling medium 402 and the capsule 100 are inserted into the machine 400, and both the capsule sensor 409 and the rolling medium sensor 419 sense the capsule 100 and the rolling medium 402, respectively, the control button 440 will turn a different color and the user then presses the control button 440 for a second time.

Pressing the control button 440 a second time starts the process of producing the smokeable product. First, the support structure 422 slides into the forward position 428, positioning the compressing screw 414 directly above both the capsule 100 and the rolling medium 402 when the rolling medium holder 418 is in the closed position 436. Optionally, the rolling medium holder 418 pivots to the closed position 436 if it was in the open position 434. Then, the compressing screw 414 travels down into the capsule 100, puncturing both foil disc 112 on the top of the capsule 100 and the closed bottom/neck 106 on the capsule 100, transferring smokeable material 101 from the capsule 100 into the rolling medium 402. Additionally, the vibration plate 408 vibrates, assisting in the transfer of smokeable material 101 from the capsule 100 into the rolling medium 402. Once transfer of the smokeable material 101 is complete, the compressing screw 414 performs a tamping function by tamping down on the smokeable material 101 within the rolling medium 402. Optionally, a separate plunger member can perform the tamping function. Once tamping is complete, the machine 400 ejects the smokeable product by pivoting the rolling medium holder 418 from the closed position 436 to the open position 434.

Optionally, before or after ejection of the smokeable product, the compressing screw 414 travels downward one more time to screw into the used capsule 100, and then travels back upward to pick up and remove the used capsule 100 from the capsule receiving compartment 406. Once the screw 414 has picked up the used capsule 100, the support structure 422 moves to the recessed positon 426 and the screw 414 releases the used capsule 100 so that it falls through the housing 404 and into the waste compartment 438.

Optionally, the machine 400 can comprise a mechanism to destroy/chop up the used capsule 100 as it travels downward into the waste compartment 438, making disposal of the used capsule 100 more efficient.

Optionally, before the smokeable product is ejected from the machine 400, the machine 400 can twist an end of the rolling medium 402 to form a twisted tip. This twisting function can be performed by the compressing screw 414, which can have a tip that grips and twists the end of the rolling medium 402.

Optionally, the machine 400 can also include either a single filter/crutch, or a cartridge of filters/crutches. In that embodiment, after the rolling medium 402 has been rolled, but before the smokeable material 101 is transferred from the capsule 100 and into the rolling medium 402, the method comprises the step of coupling a filter/crutch to one end of the rolling medium 402.

Optionally, the support structure 422 can have a camera or an RFID located therein to read bar codes and/or graphics located on the lids (foils discs) 112 of the capsule 100.

While the invention has been described with respect to a limited number of embodiments, it will be appreciated that many variations, modifications and other applications of the invention may be made. Therefore, the claimed invention as recited in the claims that follow is not limited to the embodiments described herein.

The invention claimed is:

1. A machine for preparing a smokeable product, the machine comprising:
   a) a housing;
   b) a capsule receiving compartment within the housing configured to receive a capsule used to prepare the smokeable product;
   c) a rolling medium holder coupled to the housing configured to receive and retain a rolling medium; and
   d) a support structure slidably coupled to a top surface of the housing, the support structure supporting:
      i) a tamper coupled to the support structure and configured to facilitate movement of smokeable material from the capsule into a rolling medium.

2. The machine of claim 1, wherein the tamper is electrically coupled to a tamper motor that is configured to move the tamper up and down.

3. The machine of claim 1, further comprising a capsule sensor located within the capsule receiving compartment.

4. The machine of claim 1, further comprising a rolling medium sensor located within the rolling medium holder.

5. The machine of claim 1, further comprising a vibration plate mounted to the housing and at least one vibration motor coupled to the vibration plate, wherein the capsule receiving compartment is disposed within the vibration plate.

6. The machine of claim 5, wherein there are two vibration motors coupled to the vibration plate.

7. The machine of claim 1, wherein the tamper is configured to perform a tamping function after smokeable material has been transferred to the rolling medium.

8. The machine of claim 1, wherein the support structure is slidable between a forward position and a recessed position, and when in the forward position the tamper is positioned directly above the capsule located in the capsule receiving compartment, and when in the recessed position, the tamper is positioned distal the capsule receiving compartment so that the capsule receiving compartment may be accessed by a user.

9. The machine of claim 1, wherein the machine further comprises a waste chamber coupled to the housing, the waste chamber located below the rolling medium holder and configured to receive any waste that passes through the rolling medium holder as well as used capsules.

10. The machine of claim 1, further comprising a vibration plate and at least one vibration motor coupled to the vibration plate, wherein the capsule receiving compartment is disposed within the vibration plate.

11. The machine of claim 1, wherein the rolling medium holder is movably coupled to the housing and is configured to move between an open position for receiving the rolling medium, and a closed position for forming the smokeable product.

12. A machine for preparing a smokeable product, the machine comprising:
   a) a housing;
   b) a capsule receiving compartment within the housing;
   c) a rolling medium holder movably coupled to the housing, the rolling medium holder configured to receive a rolling medium and move between an open position and a closed position; and
   d) a tamper coupled to the housing and configured to facilitate movement of smokeable material from the capsule into the rolling medium.

13. The machine of claim 12, wherein the tamper is electrically coupled to a tamper motor that is configured to move the tamper up and down.

14. The machine of claim 12, further comprising a capsule sensor located within the capsule receiving compartment.

15. The machine of claim 12, further comprising a rolling medium sensor located within the rolling medium holder.

16. The machine of claim 12, further comprising a vibration plate mounted to the housing and at least one vibration motor coupled to the vibration plate, wherein the capsule receiving compartment is disposed within the vibration plate.

17. The machine of claim 16, wherein there are two vibration motors coupled to the vibration plate.

18. The machine of claim 16, further comprising a controller electrically coupled to the rolling medium holder, the tamper, and the vibration plate, wherein the controller is configured to control movement of the rolling medium holder, the tamper, and the vibration plate.

19. The machine of claim 12, wherein the tamper and the tamper motor are slidable between a forward position and a recessed position, and when in the forward position the tamper is positioned directly above the capsule located in the capsule receiving compartment, and when in the recessed position, the tamper is positioned distal the capsule receiving compartment so that the capsule receiving compartment may be accessed by a user.

20. The machine of claim 12, wherein the machine further comprises a waste chamber coupled to the housing, the waste chamber located below the rolling medium holder and configured to receive any waste that passes through the rolling medium holder as well as used capsules.

* * * * *